US008320738B2

(12) United States Patent
Sandstrom et al.

(10) Patent No.: US 8,320,738 B2
(45) Date of Patent: Nov. 27, 2012

(54) VIDEO MANAGEMENT SYSTEM AND METHOD

(75) Inventors: Brent B. Sandstrom, Gilbert, AZ (US); Thomas J. Lorenzen, Chandler, AZ (US); George K. Belicka, Jr., Gilbert, AZ (US)

(73) Assignee: inData Corporation, Gilbert, AZ (US)

( * ) Notice: Subject to any disclaimer, the term of this patent is extended or adjusted under 35 U.S.C. 154(b) by 410 days.

(21) Appl. No.: 12/503,964

(22) Filed: Jul. 16, 2009

(65) Prior Publication Data

US 2010/0014828 A1    Jan. 21, 2010

Related U.S. Application Data

(60) Provisional application No. 61/081,565, filed on Jul. 17, 2008.

(51) Int. Cl.
*H04N 9/80* (2006.01)
*H04N 5/93* (2006.01)

(52) U.S. Cl. .................. 386/241; 386/248; 386/282

(58) Field of Classification Search .............. None
See application file for complete search history.

(56) References Cited

U.S. PATENT DOCUMENTS

| 6,682,793 | B1 | 1/2004 | Small, Jr. et al. |
| 6,721,361 | B1 | 4/2004 | Covell et al. |
| 6,993,399 | B1 | 1/2006 | Covell et al. |
| 7,215,436 | B2 * | 5/2007 | Hull et al. ............... 358/1.15 |
| 2002/0122658 | A1 * | 9/2002 | Fukuda et al. ............... 386/95 |
| 2003/0078973 | A1 * | 4/2003 | Przekop et al. ............... 709/204 |
| 2004/0080528 | A1 * | 4/2004 | Rand et al. ............... 345/738 |
| 2005/0281535 | A1 | 12/2005 | Fu et al. |
| 2006/0198249 | A1 * | 9/2006 | Okada ............... 369/1 |
| 2007/0086632 | A1 * | 4/2007 | Ramraj et al. ............... 382/128 |
| 2007/0212030 | A1 * | 9/2007 | Koga et al. ............... 386/96 |

* cited by examiner

*Primary Examiner* — William C Vaughn, Jr.
*Assistant Examiner* — Heather Jones
(74) *Attorney, Agent, or Firm* — Snell & Wilmer L.L.P.

(57) ABSTRACT

Systems and methods for video management facilitate operations on a video file based on a transcript or other annotations about the video file. On a stand-alone DVD player, DVD menu components facilitate navigation of a video file in increments corresponding to a portion of a transcript of the video file, for example one page of the transcript at a time. Transcript text may be presented as part of the DVD menu components to enable a user to read the transcript in increments and navigate the video file accordingly.

22 Claims, 8 Drawing Sheets

VIDEO MANAGEMENT SYSTEM AND METHOD

CROSS-REFERENCE TO RELATED APPLICATIONS

This application is a non-provisional of and claims priority to U.S. Provisional No. 61/081,565 filed on Jul. 17, 2008 and entitled "VIDEO PLAYBACK MANAGEMENT SYSTEM." This provisional application is hereby incorporated by reference in its entirety.

TECHNICAL FIELD

The present disclosure relates to media storage technology, and in particular to systems and methods for facilitating access to information on media.

BACKGROUND

A video file, such as a file stored on a digital video disc (DVD), may contain content of general interest to a user. However, specific portions of the video file may be of particular interest. Additionally, when a video file with a low amount of dynamic content, such as a video of a legal deposition, is viewed via a navigation system incorporating representative screen shots, such navigation may be of limited use as the scenes pictured are often nearly identical. Therefore, it may be quite difficult for a user to determine which portion of the video is of particular interest.

Further, a video file may be indexed, for example based on pages of a transcript of the video; however, without a printed copy of the transcript, a user may not be able to reference the transcript text to enable them to determine the page number of a desired page.

Therefore, there exists a need to facilitate improved navigation of a video file based at least in part on the contents of the video. For example, a user may desire to browse video of a legal deposition in order to locate and/or evaluate particular words or content. Stand-alone optical disc players often offer limited menu and navigation functionality, making targeted playback difficult. Thus, there remains a need for the ability to navigate a video file based at least in part on a transcript of the contents of the video file.

SUMMARY

Described herein are systems and methods configured to facilitate access to media. In an exemplary embodiment, an information management system comprises a video file associated with a transcript, and navigation components configured for use by a stand-alone DVD player. The navigation components facilitate selective retrieval of the video file at a granularity defined by a portion of the transcript.

In another exemplary embodiment, a method for browsing a video comprises providing a video file having a transcript, and creating a DVD menu system configured for navigation of the video file based on contents of the video transcript.

In another exemplary embodiment, a method for video management comprises locating a maximum VOB file size within a video file, the video file having a transcript. A portion of the video file prior to the maximum VOB file size is selected, and the portion of the video file is evaluated to select a first VOB file boundary position. A first VOB file corresponding to the contents of the video file from the beginning of the video file to the first VOB file boundary position is created. A second VOB file corresponding to the contents of the video file from the first VOB file boundary position to at least one of the end of the video file or a second VOB file boundary position is created.

In another exemplary embodiment, a tangible computer-readable medium has stored thereon, computer-executable instructions that, if executed by a system, cause the system to perform a method. The method comprises providing a video file having a transcript, and creating a DVD menu system configured for navigation of the video file based on contents of the video transcript.

BRIEF DESCRIPTION OF THE DRAWINGS

The claimed subject matter is particularly pointed out in the concluding portion of the specification. The present disclosure, however, both as to organization and content, may best be understood by reference to the following description taken in conjunction with the accompanying drawing figures, in which like parts are referred to by like numerals:

DETAILED DESCRIPTION

The subject matter may be described herein in terms of various functional components and processing steps. It should be appreciated that such components and steps may be realized by any number of hardware, software, or other components configured to perform the specified functions. For example, an exemplary embodiment employs various DVD menu formats and functionality. In addition, various embodiments may be practiced in any number of media delivery systems, and the embodiments disclosed are merely indicative of exemplary applications. For example, the principles, features and methods discussed may be applied to other media storage formats, for example Blu-Ray, HD-DVD, CD-ROM, and the like.

For the sake of brevity, conventional techniques for media authoring, media storage media formatting, and/or the like may not be described in detail herein. Furthermore, the connecting lines shown in various figures contained herein are intended to represent exemplary functional relationships and/or communicative, logical, and/or physical couplings between various elements. It should be noted that many alternative or additional functional relationships or physical connections may be present in a practical video management system.

For purposes of this disclosure, the term "video file" is intended to refer to any audio/visual (A/V) information, for example A/V information contained in a computer file, streaming video, magnetic tape recording, and/or the like. Principles of the present disclosure are considered to be suitable for use with any form of A/V information.

A video file, such as a deposition video, may be transcribed in order to provide textual information corresponding to speech in the video file. However, a transcript alone may be insufficient for complete evaluation of a video file. For example, a user may desire to review video associated with a portion of the transcript. Moreover, a user may desire to review video to evaluate correspondence of the transcript with actual speech in the video. Additionally, a user may desire to quickly navigate to a particular portion of the video. Further, a user may desire to review specific portions of a video file of particular interest to the user. In accordance with various exemplary embodiments, a user may navigate a video file on a stand-alone video playback device in an enhanced manner.

Figure 1A:
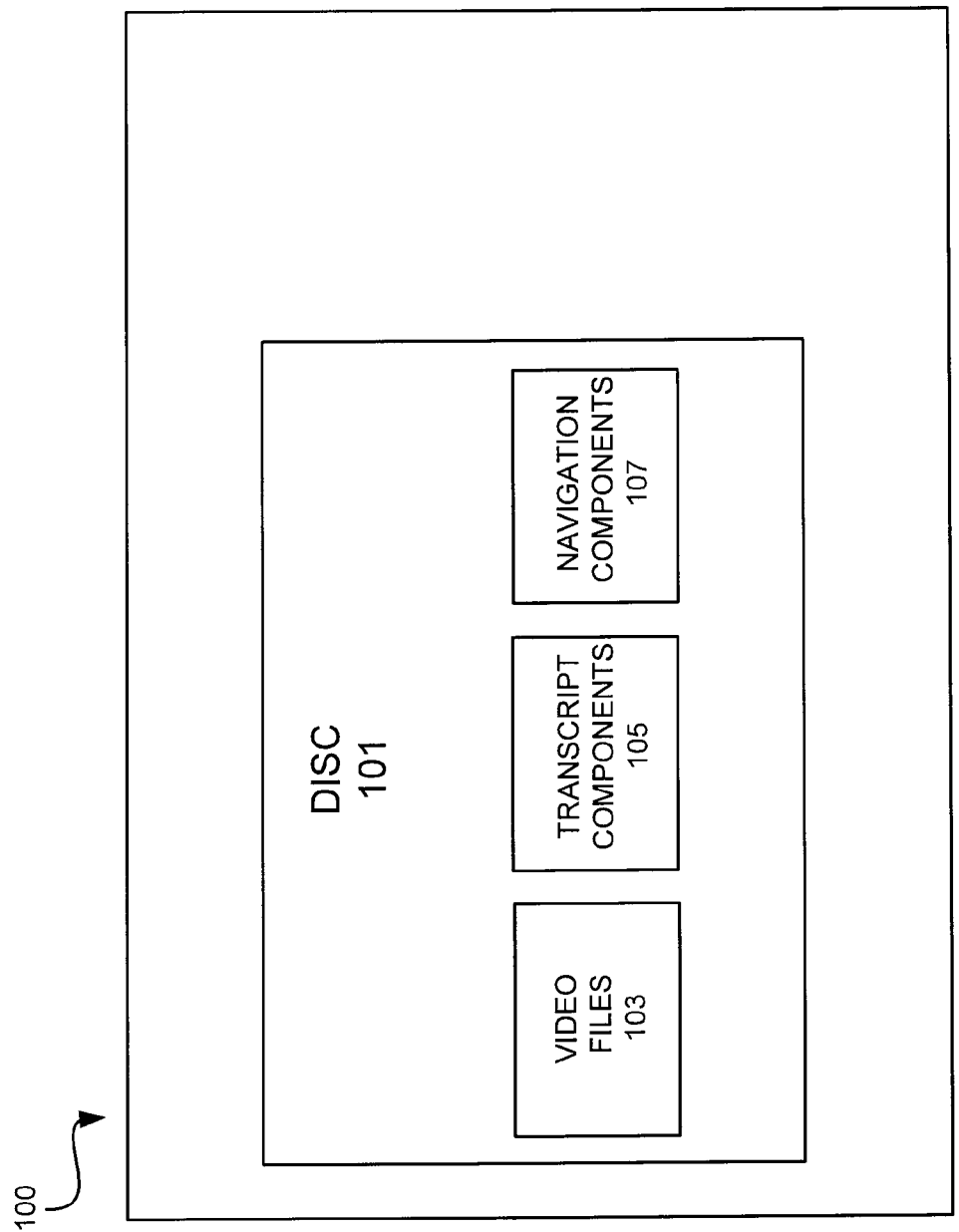
FIG. 1A illustrates a block diagram of a system for presenting information from a media source in accordance with an exemplary embodiment.

A video management system may comprise any components, settings, devices, and/or the like, configured to facilitate evaluation of a video file based at least in part on transcript information associated with the video file. With reference now to FIG. 1A, in accordance with an exemplary embodiment, a video management system 100 comprises a disc 101. Disc 101 is configured with video files 103, transcript components 105, and navigation components 107. Disc 101 may be configured for access via a standardized media retrieval device, for example a DVD player, a computer optical drive, and/or the like.

Disc 101 may comprise any physical media, formatting, file system, configuration, organization, encoding, encryption, and/or the like, configured to facilitate storage and retrieval of a video file. For example, disc 101 may comprise a DVD, a Blu-Ray disc, an HD-DVD, a CD-ROM disc, and/or the like. In an exemplary embodiment, disc 101 comprises a DVD configured for playback in a stand-alone DVD player. Disc 101 is thus configured based on standards promulgated by the DVD Forum (dvdforum.org). Disc 101 may also be configured for playback via a personal computer or other general-purpose computing device. Moreover, disc 101 may be configured in any suitable manner suitable to enable video content on disc 101 to be selectively retrieved, as desired. In an exemplary embodiment, disc 101 is configured with one or more video files 103, one or more transcript components 105, and one or more navigation components 107.

A video file 103 may comprise any A/V information of interest to a user. In an exemplary embodiment, video file 103 comprises a VOB file wrapper containing information in MPEG-2 format. In another exemplary embodiment, video file 103 comprises an H.264 file. Moreover, video file 103 may be formatted in any suitable manner and/or with any suitable codec, compression, wrapper, encryption, resolution, frame rate, and/or the like, and the principles of the present disclosure are not limited to operations performed on any particular type of video file.

Video files 103 are associated with at least a portion of transcript components 105. In an exemplary embodiment, video files 103 may be indexed, navigated, retrieved, played back, and/or the like via use of navigation components 107 created in connection with transcript components 105.

Moreover, video files 103 may be edited, appended, compressed, transcoded, and/or otherwise altered in preparation for use in system 100. For example, a particular video file 103 may contain a significant amount of "dead" space at the beginning of the file (e.g., a period of time without any speech, a period of time prior to the beginning of a deposition, and/or the like). In order to conserve storage space on disc 101, portions of dead space in a video file 103 may be removed and/or otherwise modified in connection with inclusion of video file 103 in system 100. Moreover, responsive to modifications of a video file 103, various transcript components 105 (e.g., timecode information and the like) may be modified to reflect the changes in a particular video file 103.

For example, a second video file 103 may be appended to a first video file 103 in order to form a composite video file 103. Timecode information associated with the second video file 103 may initially be configured as local timecode information (i.e., the time references are with respect to the beginning of the second video file 103). These timecode references may suitably be modified in order to reflect the revised location of the second video file 103 within the composite video file 103. For example, each timecode reference associated with the second video file 103 may be incremented by a value equal to the duration of the first video file 103. In this manner, timecode references for the first video file 103 and the second video file 103 can be made consistent within composite video file 103. Moreover, any other suitable modifications, excisions, deletions, edits and/or the like may suitably be employed on video files 103 and/or corresponding transcript components 105 in order to prepare them for inclusion in system 100.

Transcript components 105 may comprise any information, files, text, annotations, markup, and/or the like, associated with video file 103 and configured to facilitate navigation and/or browsing of a video file 103 based at least in part on information contained in transcript components 105. For example, transcript components 105 may comprise transcribed speech from a video file 103, timecode information, page information, line information, speaker information, question/answer information, and/or the like, as desired. With continued reference to FIG. 1A, in an exemplary embodiment, transcript components 105 comprise an extensible markup language (XML) text file. The XML text file contains transcribed speech (for example: <Text>MR. JONES: Are you board certified in pulmonary care?</Text>), timecode information (for example: <TimeMs>36319</TimeMs>, <TimeOfDay>11:41:22</TimeOfDay>, <UTC>15 November 2008 01:02:03.456789</UTC>, and/or the like), page information (for example: <PageNo>75</PageNo>), line information (for example: <Line></Line>, <Line ID=200>, <LineNo>14</LineNo>, and/or the like), speaker information (for example: <Speaker>MR. JONES</Speaker>), and question/answer information (for example: <QA>Q</QA>). Moreover, the XML text file may contain any additional information associated with the corresponding video file 103 as desired. Transcript components 105 may correspond to and/or may suitably be utilized to create one or more navigation components 107 associated with a video file 103.

Navigation components 107 may be created to enable a user to selectively browse, navigate, retrieve, play back, and/or perform any other desired operation on portions of a video file 103 as stored on disc 101. Navigation components 107 may comprise any suitable buttons, menus, images, links, references, instructions, macros, scripts, code, and/or the like, as desired. For example, navigation components 107 may comprise main menus, page level menus, play buttons, view transcript buttons, forward buttons, back buttons, return buttons, and/or the like. Navigation of video file 103 may be facilitated by creating various navigation components 107. For example, DVD menu buttons may be created in order to enable a user to locate a desired point in a video file 103.

Figure 1B:
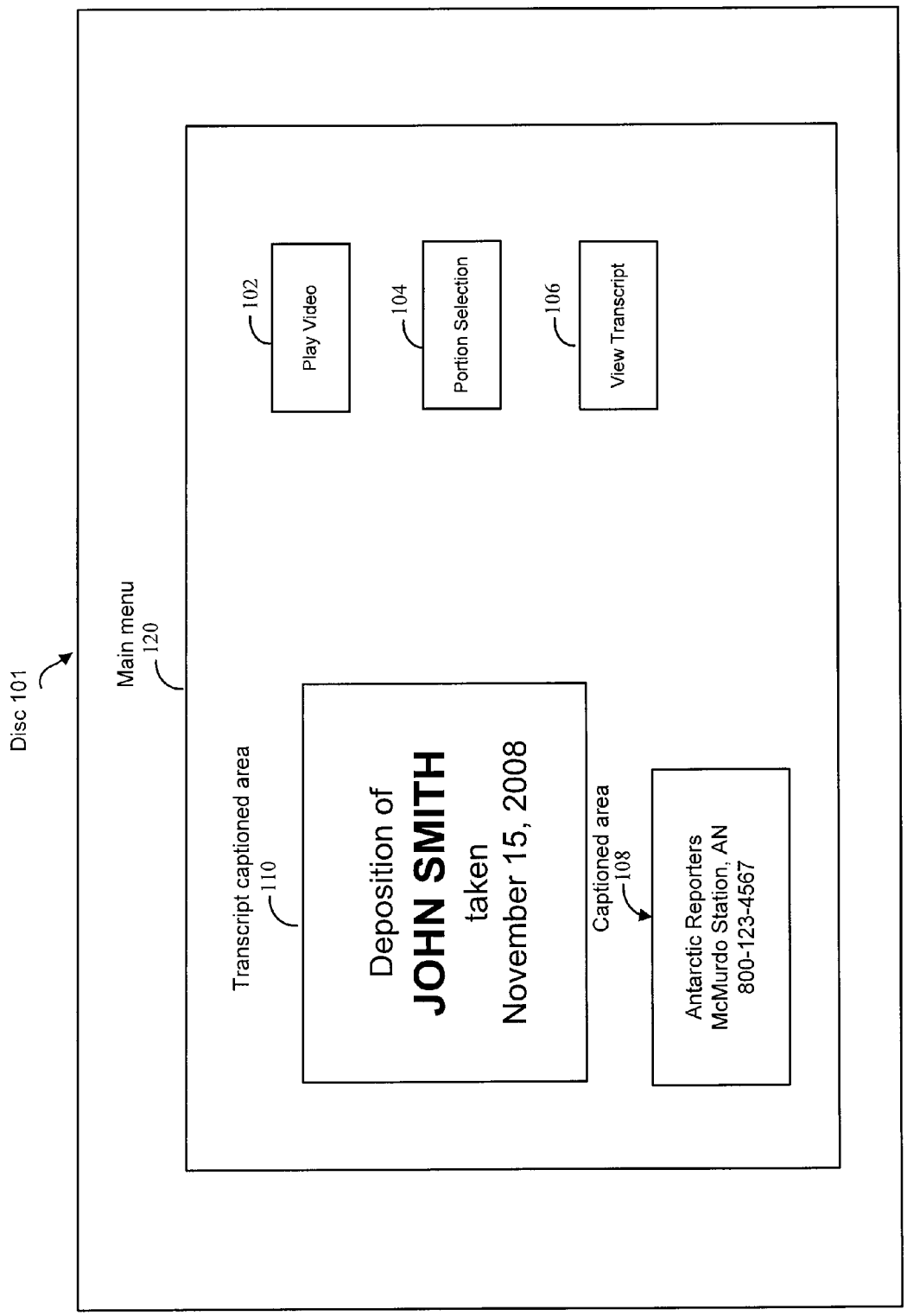
FIG. 1B illustrates various navigation and informational components of a video media, such as a disc, in accordance with an exemplary embodiment.

With further reference to FIG. 1B, and in accordance with an exemplary embodiment, disc 101 is configured with at least one navigation component 107, for example a main menu 120. Main menu 120 comprises a play video button 102, a portion selection button 104, a view transcript button 106, a captioned area 108, and a transcript captioned area 110. Moreover, main menu 120 may comprise any suitable elements configured to enable playback, navigation, and/or other operations on a video file 103, as desired.

Play video button 102 may be any component configured to trigger playback of a video file 103. With continued reference to FIG. 1B and in accordance with an exemplary embodiment, play video button 102 comprises a DVD menu button. Play video button 102 may be configured in any suitable manner in order to facilitate playback of a video file 103.

Figure 2:
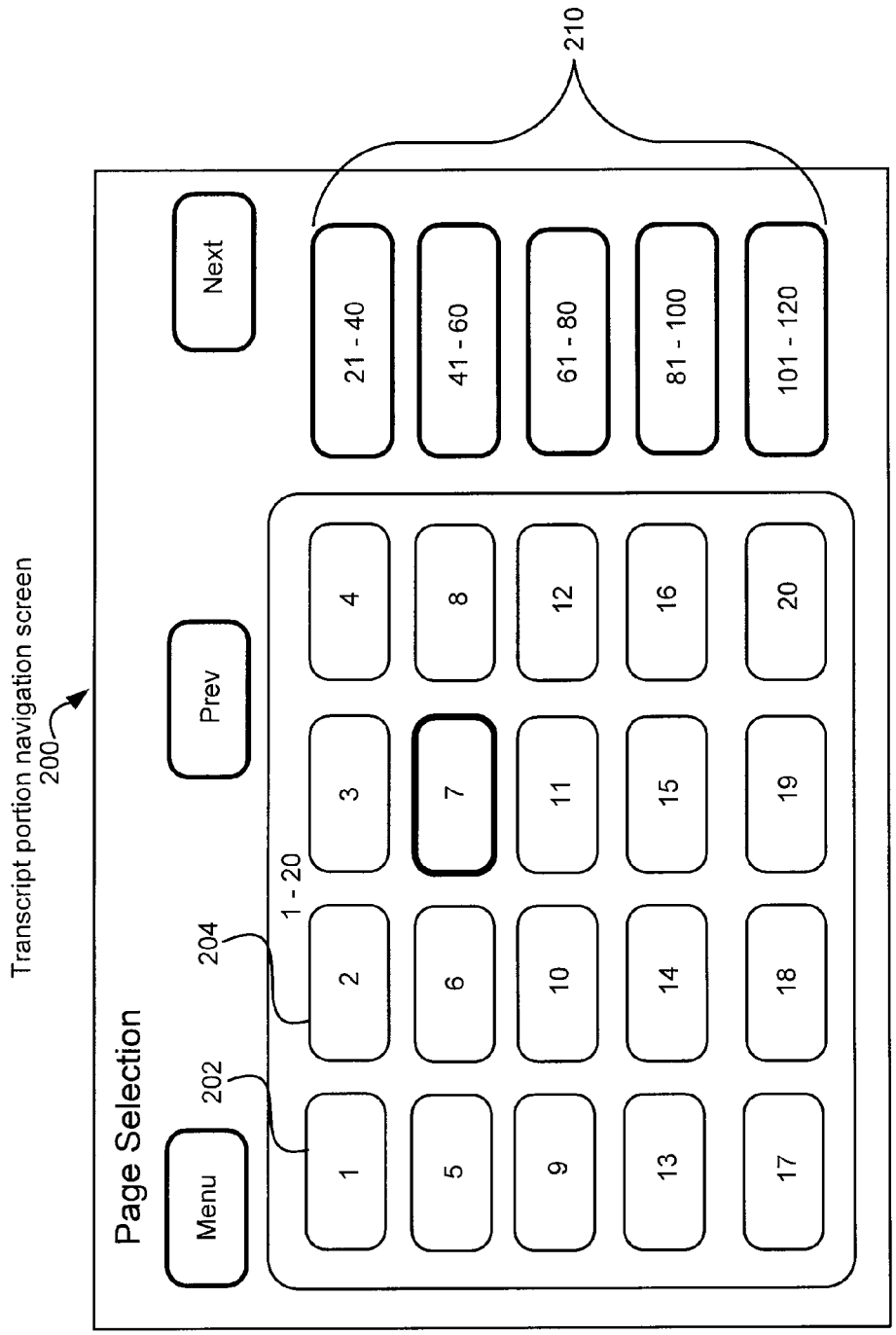
FIG. 2 illustrates a transcript portion navigation screen in accordance with an exemplary embodiment.

Portion selection button 104 may be any component configured to trigger display of a portion selection menu, for example transcript portion navigation screen 200 as shown in FIG. 2. In an exemplary embodiment, portion selection button 104 comprises a DVD menu button. Portion selection button 104 may be configured in any suitable manner to trigger display of a portion selection menu.

View transcript button 106 may be any component configured to trigger display of at least one navigation component 107, for example a DVD menu corresponding to at least a portion of a video file transcript, such as a deposition transcript. In an exemplary embodiment, view transcript button 106 comprises a DVD menu button. View transcript button 106 may be configured in any suitable manner to trigger display of a DVD menu corresponding to a video file transcript.

Captioned area 108 may be any component configured to present information, for example information about a company providing a video file transcript. In an exemplary embodiment, captioned area 108 comprises an area on a DVD menu. Captioned area 108 may be customized as desired, and may be configured in any suitable manner to present desired information. Moreover, captioned area 108 may be omitted, as desired.

Transcript captioned area 110 may be any component configured to present information about a video file 103. In an exemplary embodiment, transcript captioned area 110 comprises an area on a DVD menu. Transcript captioned area 110 may be configured to present any desired information, for example the name of a person appearing in a video file 103, the date a video file 103 was recorded, the length of a video file 103, a reason a video file 103 was recorded, and/or the like. Transcript captioned area 110 may be customized, and may be configured in any suitable manner to present desired information about a video file 103. Moreover, transcript captioned area 110 may be omitted, as desired.

With further reference to FIG. 2, main menu 120 is configured to facilitate access to a video file 103. In an exemplary embodiment, access to a video file 103 may be achieved by activating a navigation component 107, for example page button 202, page button 204, and/or the like. Moreover, main menu 120 may be configured to enable access to various sub-menus. To this end, transcript portion navigation screens 200, transcript page screens 300, and/or the like may be created and configured to provide navigation capabilities, as desired.

For example, with reference now to FIGS. 1B and 2, and in accordance with an exemplary embodiment, a portion selection button 104 is configured to link to a navigation screen, for example transcript portion navigation screen 200. Transcript portion navigation screen 200 comprises a listing of page buttons corresponding to video file transcript pages. If the number of video file transcript pages is large, transcript portion navigation screen 200 may also comprise page range buttons 210 linking to additional transcript portion navigation screens 200 which comprise additional listings of video file transcript pages. When a particular page button, such as page button 202, is selected, a corresponding transcript browsing screen, such as transcript page screen 300, is displayed.

According to an exemplary embodiment, transcript portion navigation screen 200 is configured to display video file timestamp information corresponding to each video file transcript page. For example, page button 202 linking to video file transcript page 1 may display timestamp information such as (0:00 to 0:56), page button 204 linking to video file transcript page 2 may display (0:57 to 1:44), and so on.

In another exemplary embodiment, transcript portion navigation screen 200 is configured to facilitate navigation of a video file 103 by a criterion other than video file transcript pages. For example, a video file transcript may be indexed and browsed by such criteria as author, notes in transcript, change of speaker, and/or the like. Moreover, transcript portion navigation screen 200 may be configured to facilitate navigation of a video file 103 by any suitable criterion. Further, a video file transcript may be mapped to an optical disc menu system, for example a DVD menu system, one page at a time. In other exemplary embodiments, a video file transcript is mapped to an optical disc menu system one sentence at a time. A video file transcript may be mapped to an optical disc menu system and/or other media storage menu system at any granularity—one paragraph at a time, one sentence at a time, one speaker at a time, and/or the like, as desired.

Figure 3:
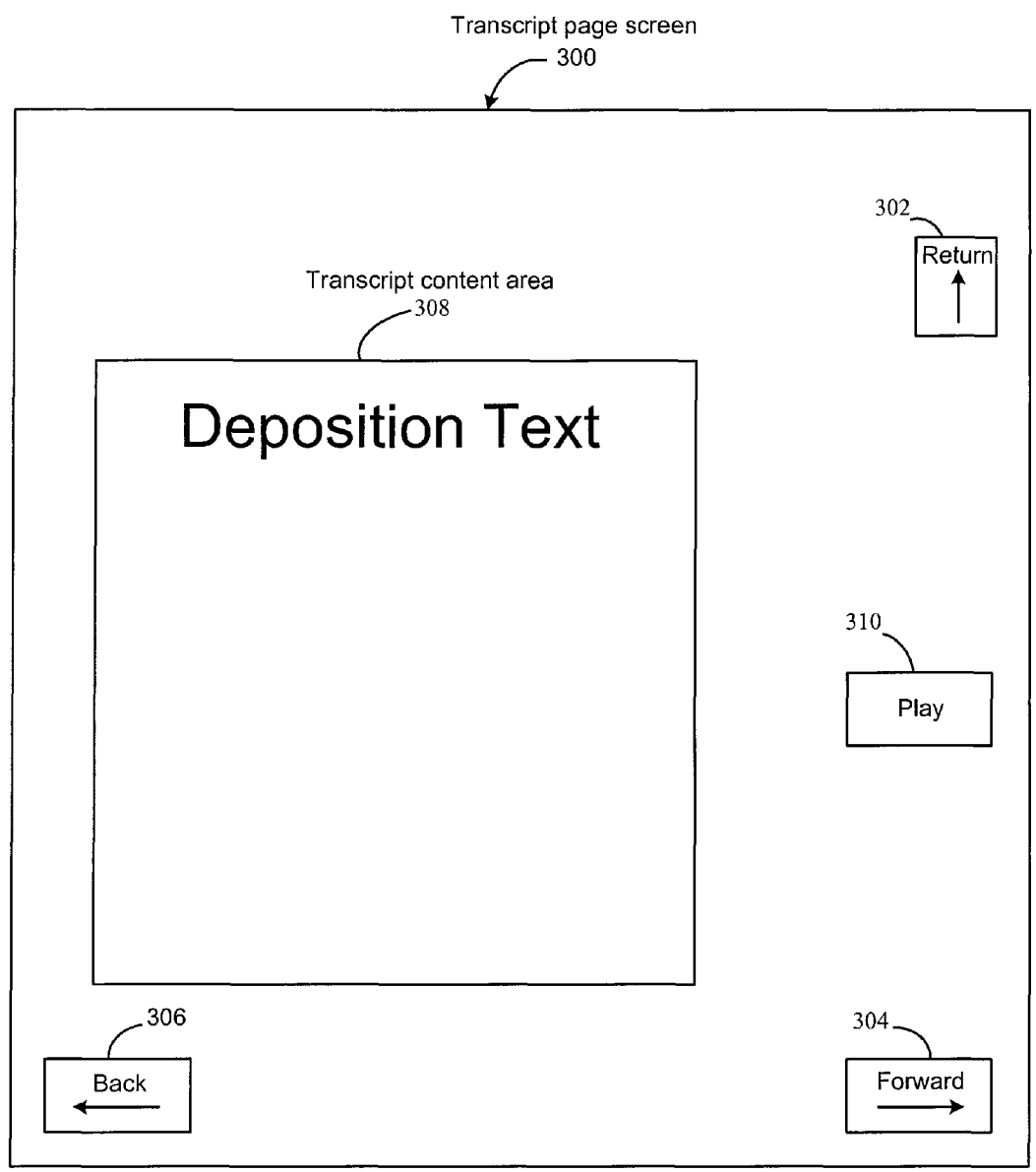
FIG. 3 illustrates a transcript page screen in accordance with an exemplary embodiment.

When a user desires to access a particular page of a transcript and/or contents of a video file 103 corresponding thereto, certain navigation components 107 may be configured to facilitate access to the desired information. For example, with reference now to FIG. 3, and in accordance with an exemplary embodiment, a page button, such as page button 202, is configured to link to a transcript browsing screen, such as transcript page screen 300. Transcript page screen comprises return button 302, forward button 304, backward button 306, transcript content area 308, and play button 310. Return button 302 may trigger display of a transcript portion navigation screen such as transcript portion navigation screen 200 in FIG. 2. Moreover, return button 302 may trigger display of main menu 120 as shown in FIG. 1B. Forward button 304 triggers display of the next transcript page screen 300, if existing. Backward button 306 triggers display of a previous transcript page screen 300, if existing. In an exemplary embodiment, transcript content area 308 comprises video file transcript content corresponding to a particular page of a video file transcript. In various other exemplary embodiments, transcript content area 308 comprises video file transcript content corresponding to any desired portion of a video file transcript (e.g., page, paragraph, question/answer pair, and the like). Play button 310 triggers playback of a video file 103 at a location substantially corresponding to the beginning of video file transcript content displayed in transcript content area 308. Moreover, transcript page screen 300 may be configured with additional and/or fewer components and/or functionality, as desired. For example, when video file transcript content displayed in content area 308 does not have corresponding video information (e.g., for title pages, signature pages, and/or the like), play button 310 may link to the beginning of a video file and/or may be omitted, as desired.

Figure 4:
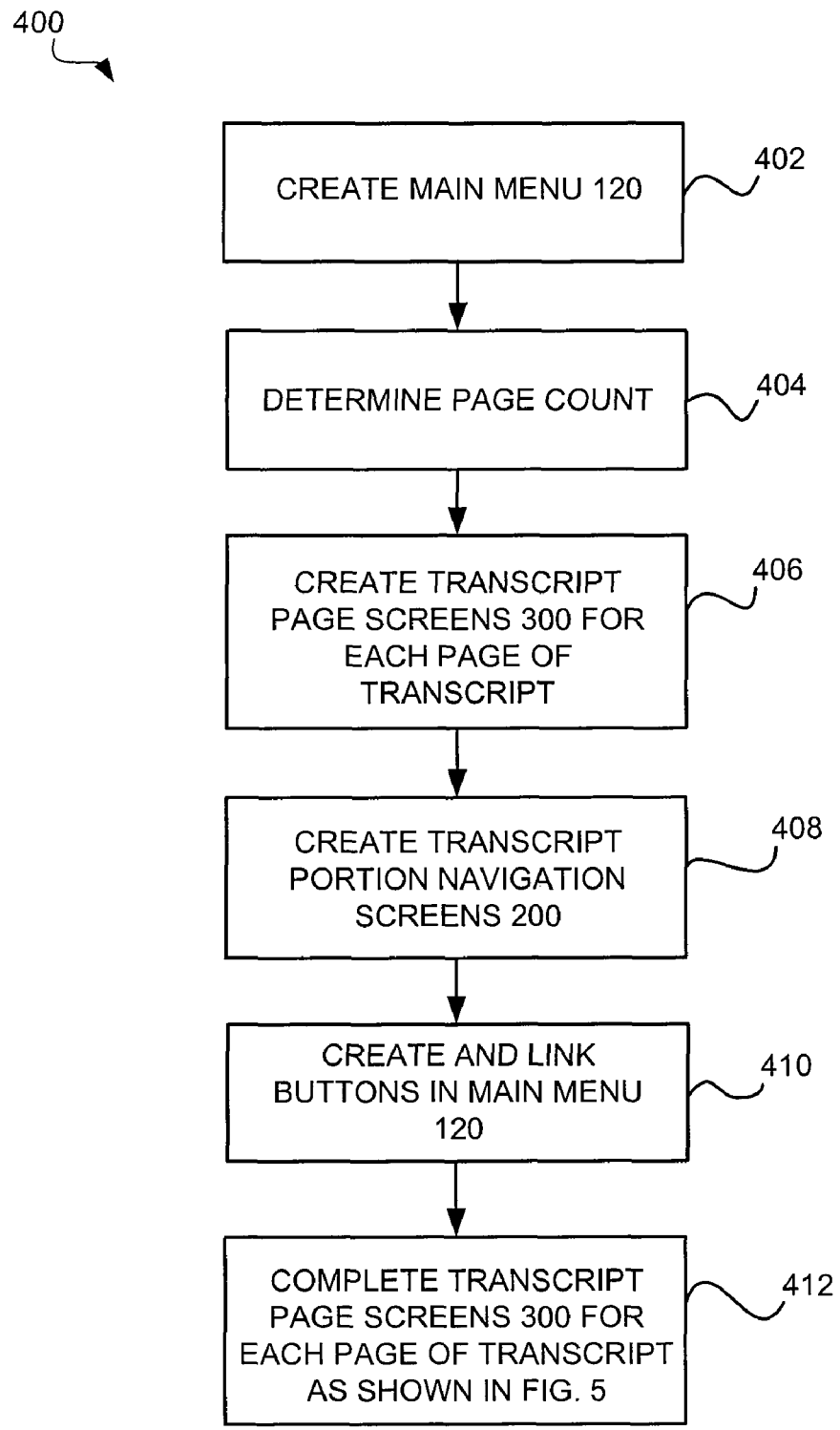
FIG. 4 illustrates a block diagram of a method for creating a DVD in accordance with an exemplary embodiment.

Additionally, disc 101 may suitably be created via a method for creating a media source. With reference now to FIG. 4 and in accordance with an exemplary embodiment, a method 400 for creating a media source is presented. A video file, for example a video recording of a legal deposition, is provided and transcribed. The transcript is stored in an electronic file, such as an ASCII file, a Unicode file, an XML file, or the like. Moreover, the transcript may be stored in any suitable format to enable the transcript to be read by an electronic device.

Video file time index information, such as the beginning time of lines in the transcript, the beginning time of pages of the transcript, the time associated with the appearance of certain words in the transcript, and/or the like, or any combination of the above, is also provided. Moreover, video file time index information may be directed to any suitable location and/or event in the transcript, and the foregoing examples are merely for way of illustration, and not limitation. Additionally, video time index information may be included in the transcript file, or may be stored in a separate location.

A main menu is created (step 402), and background graphic components, informational components, graphic design components, and/or navigation components may suitably be added to the main menu, as desired. For example, the main menu background image may be of a size and format which complies with a DVD standard for a DVD menu, such as an image having a resolution of 720 pixels by 480 pixels. Moreover, the main menu background image may be configured, sized, scaled, modified, transcoded, converted, and/or the like, for example to provide compatibility with a desired video standard (e.g., NTSC, PAL, and/or the like), a desired aspect ratio (e.g., 4:3, 16:9, and/or the like), or other desired configuration of a particular DVD. A "play video" button (e.g., button 102 in FIG. 1B) is added to the main menu, and linked to the beginning of the video on the DVD for playback.

The number of pages of text in the transcription is determined (step 404), for example by reading a data field in the transcript file recording the number of pages of the transcript file. Alternatively, the transcript file may be opened and the number of pages may be counted as the file is read from beginning to end. Moreover, the number of pages of the transcript file may be determined by any suitable method, such as by counting form feed characters, counting the occurrence of line 1 indicators, and the like.

Once the page count is determined, a series of DVD menus (e.g., transcript page screens 300) are created, one for each page of the transcript (step 406).

If desired, a number of additional DVD menus (e.g., transcript portion navigation screens 200) may be created to facilitate navigation (step 408). For example, with momentary reference to FIG. 2, one transcript portion navigation screen 200 may be created for each 20 pages of transcript text. For each transcript portion navigation screen 200, a "next" button linking to the next transcript portion navigation screen 200 is added. On the last transcript portion navigation screen 200, the "next" button links to the first transcript portion navigation screen. Similarly, for each transcript portion navigation screen 200, a "previous" button linking to the prior transcript portion navigation screen 200 is added. On the first transcript portion navigation screen 200, the "previous" button links to the last transcript portion navigation screen 200. Again, for each transcript portion navigation screen 200, a "menu" button linking to main menu 120 is created. Page range buttons 210 are added to each transcript portion navigation screen 200, and link to the corresponding transcript portion navigation screen 200.

Next, a portion selection button 104 is created within main menu 120 and linked to the first transcript portion navigation screen 200. A view transcript button 106 is created within main menu 120 and linked to the first transcript page screen 300 (step 410). Additionally, further navigational and/or informational components are added and/or linked on various transcript page screens 300, as illustrated in FIG. 5 (step 412).

Figure 5:
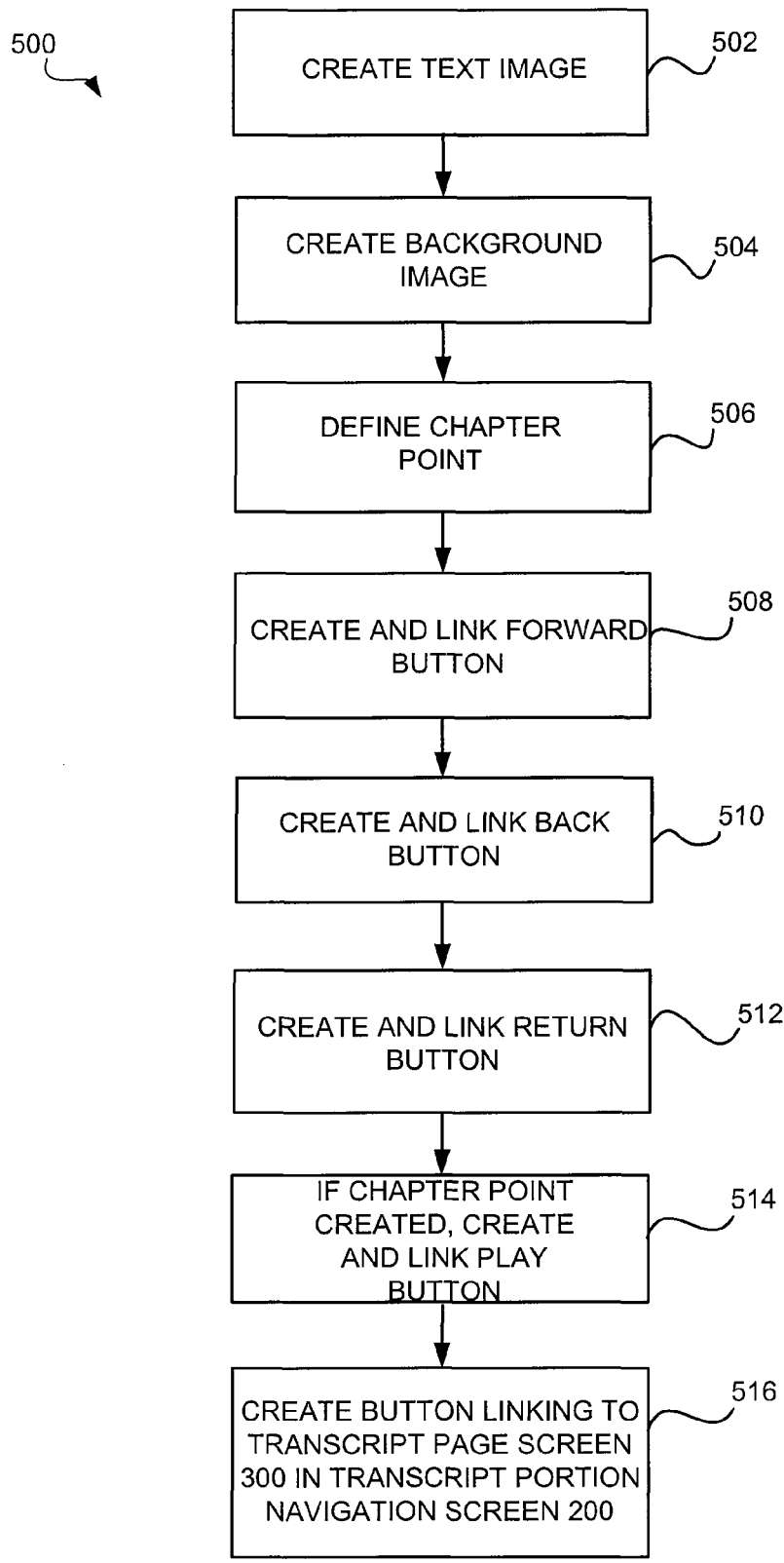
FIG. 5 illustrates a block diagram of a method for creating DVD menus in accordance with an exemplary embodiment.

Turning now to FIG. 5, in an exemplary embodiment, one or more transcript page screens 300 are further prepared and configured, as follows:

For each page of the transcript text, the text of the current page is retrieved from the transcript file. Time index information for the current page, such as beginning and ending time, is also retrieved. Alternatively, time index information for the first line of printable text on the current page is retrieved. Moreover, any suitable time index information configured to facilitate access to the current page may be retrieved. The text of the current transcript page is converted to a raster graphic image, such as an MPEG still frame (step 502). The image is configured such that it represents the printed page of text. The font, font size, line positioning, line spacing, layout, formatting, and the like may be selected to provide a suitable level of text readability, for example when viewed on a DVD player.

A DVD menu background image associated with the current transcript page is created (step 504). The DVD menu background image may be of a size and format which complies with a DVD standard for a DVD menu, such as an image having a resolution of 720 pixels by 480 pixels. Moreover, the DVD menu background image may be configured, sized, scaled, modified, transcoded, converted, and/or the like, for example to provide compatibility with a desired video standard (e.g., NTSC, PAL, and/or the like), a desired aspect ratio (e.g., 4:3, 16:9, and/or the like), or other desired configuration of a particular DVD. The DVD menu background image may be a composite image formed from the raster graphic image formed from transcript text and any additional image data desired by a user. Alternatively, the DVD menu background image may comprise only the raster graphic image formed from transcript text.

If the current page of the transcript is associated with timecode information, a chapter point is defined in a video file 103 at a location corresponding to the beginning timecode for the current page (step 506).

A set of navigation buttons are created for the transcript page screen 300. A "Forward" button (e.g. button 304) is created and linked to the next transcript page screen 300 (step 508). If the transcript page screen 300 in question is the last transcript page screen 300, the "Forward" button may link to the first transcript page screen 300, may link to main menu 120, may link to any other desired location, and/or may be omitted, as desired.

A "Back" button (e.g., button 306) is created and linked to the prior transcript page screen 300 (step 510). If the transcript page screen 300 in question is the first transcript page screen 300, the "Back" button may link to the last transcript page screen 300, may link to main menu 120, may link to any other desired location, and/or may be omitted, as desired.

A "Return" button (e.g., button 302) is created and linked to a chosen location (step 512). The return button may link to main menu 120, may link to a transcript portion navigation screen 200, and/or may link to any other desired location, as desired.

If a chapter point was created in step 554 above, a "Play" button (e.g., button 310) is created and linked to the location in a video file 103 corresponding to the chapter point (step 514).

In the transcript portion navigation screen 200 corresponding to the current transcript page screen 300, a button (e.g., button 202, button 204, and/or the like) is created and linked to the current transcript page screen 300 (step 516). Moreover, other navigation buttons may be provided within any and/or all transcript page screens 300 and/or transcript portion navigation screens 200, as desired, to further enable a user to browse and access the contents of a video file 103.

The process illustrated in FIG. 5 may be repeated as desired until navigation components for a desired number of pages in a transcript, for example each page in a transcript, have been created and/or linked to one another in a suitable manner.

Additionally, limitations of certain media formats, such as the DVD format, may impose various navigational and/or structural constraints. For example, the DVD format imposes a limit of 99 chapters per title. In accordance with an exemplary embodiment, one page of a video transcript file corresponds to one chapter in a title in a title set. Because a video transcript file may exceed 99 pages in length, additional titles and/or title sets may be created in order to provide one chapter per transcript page (or per other selected transcript portion). Therefore, if the number of transcript pages corresponding to a particular video file 103 exceeds the number of chapters allowed per title in a title set in the DVD specification, one or more additional titles and/or title sets may be created as desired. Within these one or more additional titles and/or title sets, DVD menus corresponding to each transcript page may be created, for example as described in FIG. 5B. Suitable navigation components 107 linking multiple titles associated with a particular video file 103 may also be provided. In this manner, DVD menus corresponding to a desired portion of a video transcript file, for example each page of a video transcript file, are created, and navigation of a video transcript file is facilitated.

For example, jumps between titles within a title set may suitably be accomplished via utilization of a JumpVTS_PTT command. Additionally, jumps between titles located within different title sets on a DVD may suitably be accomplished via use of one or more program chains (PCGs) created at the DVD Video Manager Menu (VMGM) level on a DVD. PCGs providing navigational instructions corresponding to each chapter on a DVD may be created at the VMGM level. In this manner, a jump to a particular chapter may be accomplished from any location on a DVD. For example, a transcript page screen 300 associated with the last chapter in a particular title (and corresponding to a particular page of a transcript) may be configured with a forward button 304 linking to the first chapter in a different title and/or title set (and corresponding to the next page of the transcript), as discussed above. Forward button 304 may thus link to a PGC at the VMGM level configured to facilitate navigation to the desired title set, title, and chapter. Stated another way, a navigation jump between titles may be accomplished by a "jump up" to the VMGM domain, and then a "jump down" as directed by a particular PGC into the desired destination title set, title, and chapter.

Once a desired number of suitable menus have been created, a physical media incorporating these menus can be authored. This physical media may be a DVD, such as a DVD authored in accordance with the Universal Disk Format (UDF) 1.02 as codified by ISO 13346. The physical media may also be authored as a "bridge" DVD disc having a hybrid UDF structure with additional ROM data. Moreover, the physical media incorporating these menus may be any suitable media configured to receive components of system 100.

Additionally, in an exemplary embodiment, system 100 comprises enhanced on-screen overlays during video playback, for example subtitles and/or the like. Such overlays may provide, for example, page and/or line numbers, transcript text, and/or any additional desired information corresponding to a video transcript where the current dialogue may be found.

In various exemplary embodiments, system 100 comprises an event index, such as an index of deposition events, which may be linked to particular navigation buttons on a DVD. For example, events such as recesses, changes in deposing counsel, on and off record points, and the like, may be recorded and indexed. A user may then access a video file 103 by reference to one or more of these events.

Further, system 100 may comprise an enhanced time index, such as a time-of-day index. Timecode information corresponding to time of day may be recorded for each page of a video transcript. This timecode information may be integrated into a DVD menu system as disclosed above. A user may then access a video file 103 by reference to known time-of-day points.

Additionally, system 100 may comprise a keyword index. For example, keywords which are determined to be important and/or unique in the context of a particular video file 103 may be indexed. The keyword index may be integrated into a DVD menu system as disclosed above. A user may then access a video file 103 by reference to keywords.

It should be noted that while this disclosure is directed primarily to media stored on DVD discs and displayed on stand-alone DVD players, the concepts described herein can also be applied to other storage formats. For example, the principles of system 100 can be applied to HD-DVD, Blu-Ray, CD-ROM, and the like.

Further, system 100 may comprise features configured to split video files 103 into multiple titles within a DVD title set and/or multiple title sets within a DVD, as desired. For example, audio gaps, such as spoken text gaps or dropouts, may desirably be minimized and/or eliminated during playback of video that spans VOB file boundaries when played back as individual files. In accordance with an exemplary embodiment, VOB file boundaries are defined at locations in a video where audio data is of reduced value (e.g. during gaps in spoken testimony and/or other periods of relative silence, and the like). Moreover, certain content in a first VOB file may be duplicated in a second VOB file in order to reduce playback audio gaps.

As mentioned previously, break points between VOB files may be selected in a manner configured to reduce audio and/or video dropouts or gaps during playback. For example, many litigation support software products create clips from depositions on DVD-Video that introduce omissions from the testimony when the clip spans multiple VOB files. Because such software products often use Microsoft DirectShow to playback DVD-Video at a file level (instead of utilizing titles and chapters) there is a possibility of omitting testimony when a clip references the beginning of a VOB file that is not the first VOB file within a particular DVD title set (VTS). These omissions are not apparent when a DVD is played back on a set-top DVD player; however, they may arise when presenting DVD content using DirectShow.

For example, a deposition DVD created by a set-top recording device may include video containing the phase "language of scope of service" spanning a portion of files VTS_01_3VOB and VTS_01_4VOB on the DVD disc. For example, VTS_01_3.VOB ends part way through the word "language" (e.g., at "lang"). The full phrase is heard completely, without any interruption or dropout, when played back on a set-top DVD player, or with software on a computer that uses the DVD-Video structure of titles, chapters, and timecodes for playback versus playback of individual files. However, when played back as individual files with Microsoft DirectShow, VTS_01_3.VOB playback ends part way through the word "language" (e.g., after "lang"), but VTS_01_4VOB does not begin playback until the " . . . of service" portion of the phrase. Therefore, there are approximately 2 and one half words [i.e., "(lang)uage of scope"] that are omitted when the video is played back as an individual VOB file with DirectShow. Therefore, during review of video associated with these VOB files, this deposition testimony may be omitted.

This issue arises because the DVD specification dictates that all of the content for a particular VTS is contiguous on a DVD, but yet is broken up into files not exceeding 1 gigabyte (GB) in size in order to be compatible with various computer operating systems. VOB files are typically broken up without regard to content of the actual video, thus making it difficult to precisely play back any VOB file other than the first within the VTS. This is because subsequent VOB files within a VTS may contain just the navigation pack, and therefore the content within a particular VOBU may be shorter than the playback time of the VOBU itself.

In the DVD specification, a VOBU is defined as the smallest unit of video that can be played back from a VOB file. The playback time for a VOBU may be anywhere from four-tenths (0.4) second to one (1.0) second, with the exception of the last VOBU within a VOB, which has a playback time of one and two-tenths (1.2) seconds. Each VOBU begins with a Navigation Pack (NAV) and is followed by several Group of Pictures (GOP) structures which may contain video, audio, sub-picture, and/or other related data. However, a VOBU is not required to contain any data other than the NAV. Further, although some professional DVD authoring packages may permit the user to create new VOB files for each DVD chapter, this ability is not present with the vast majority of set-top DVD video recorders, for example recorders popular within the legal video industry. Therefore, system 100 may desirably be configured to minimize and/or eliminate playback issues associated with such set-top DVD recorders.

For example, system 100 may utilize audio energy maps, video timecode information, deposition Question & Answer (Q&A) navigation points from a transcript XML file, and/or the like, in order to selectively create intelligent "break points" between VOB files. These break points may be used to generate one or more new titles and/or video title sets, and thus to generate one or more new VOB files which begin during periods of relative silence. Because a new VTS has been created, the ensuing VOB file will always start at a precise location. Therefore, individual VOB files may be prevented from beginning (or ending) in the middle of deposition dialogue, in any location where valuable audio and/or video information may potentially be omitted during playback as a result, and/or in any other undesirable location. Moreover, the creation of one or more new VTS will not impair playback of a disc 101 on a stand-alone DVD player.

For example, a particular video file 103 may be about 1.5 GB in size when formatted suitable for inclusion on a DVD. Video file 103 may correspond to about 50 pages of video transcript information. Thus, because this video file 103 is larger than 1 GB, it will span multiple VOB files when placed on a DVD. Therefore, valuable audio content may be dropped when the resulting DVD is played back as an individual VOB file, for example with Microsoft DirectShow.

In an exemplary embodiment, a break point may be selected based at least in part on audio energy map information. In order to prevent valuable audio from being dropped, a break point may be selected at a location where audio data is of reduced value (e.g., during a period of silence between an answer and a subsequent question, during a period where a witness is reviewing a document, and/or the like). In an exemplary embodiment, a portion of video file 103 prior to the 1 GB file limit may be evaluated for placement of a break point. For example, the portion of a video file 103 corresponding to the 120 seconds prior to the 1 GB limit may be evaluated. Other video portion sizes may be evaluated, for example 60 seconds prior to the 1 GB file limit, 180 seconds prior to the 1 GB file limit, and/or the like. Any suitable video portion size may be evaluated for placement of a break point, as desired.

Within the selected portion of video file 103 (e.g., the "potential break window"), an suitable break point may then be located. For example, system 100 may evaluate an audio energy map of the potential break window and select a sustained period of low audio energy within the potential break window for use as a break point. In an exemplary embodiment, a period of low audio energy may be selected as a break point if the low audio energy has a sustained duration of at least one second. In another exemplary embodiment, a period of low audio energy may be selected as a break point if the low audio energy has a sustained duration of at least two seconds. Moreover, any suitable period of low audio energy may be selected as a break point. In general, periods of low audio energy having a sustained duration of less than 1000 milliseconds may preferably not be selected for placement of a break point, as this duration may be insufficient to ensure dropout of valuable audio is prevented.

Moreover, in an exemplary embodiment, a break point may be selected based at least in part on video transcript information. For example, a video transcript in XML format may include tags indicating if a particular transcript line is part of a question, part of an answer, off the record, and so on. Thus, for example, a break point may be selected at a location in a potential break window after the completion of a particular question-answer pair, and prior to the beginning of the subsequent question-answer pair. Additionally, a break point may be selected in a potential break window during multiple transcript lines that are neither questions nor answers (e.g., discussions about going off the record, and/or the like). Moreover, a break point may be selected using any suitable criteria in order to ensure valuable audio information is not dropped.

Once a break point has been established, suitable links between the resulting VOB files and/or navigation structures may be provided. For example, if as a result of a break point selection, a resulting file VTS_01_1.VOB contains video information corresponding to pages 1 through 26 of a video file transcript, and a resulting file VTS_02_1.VOB contains video information corresponding to pages 27 through 48 of a video file transcript, navigation components 107 associated with page 26 of the video file transcript may be configured to facilitate navigation from VTS_01_1.VOB to VTS_02_1.VOB. For example, transcript page screen 300 associated with page 26 of the video file transcript may be configured with a forward button 304 linking to transcript page screen 300 associated with page 27 of the video file transcript.

Figure 6:
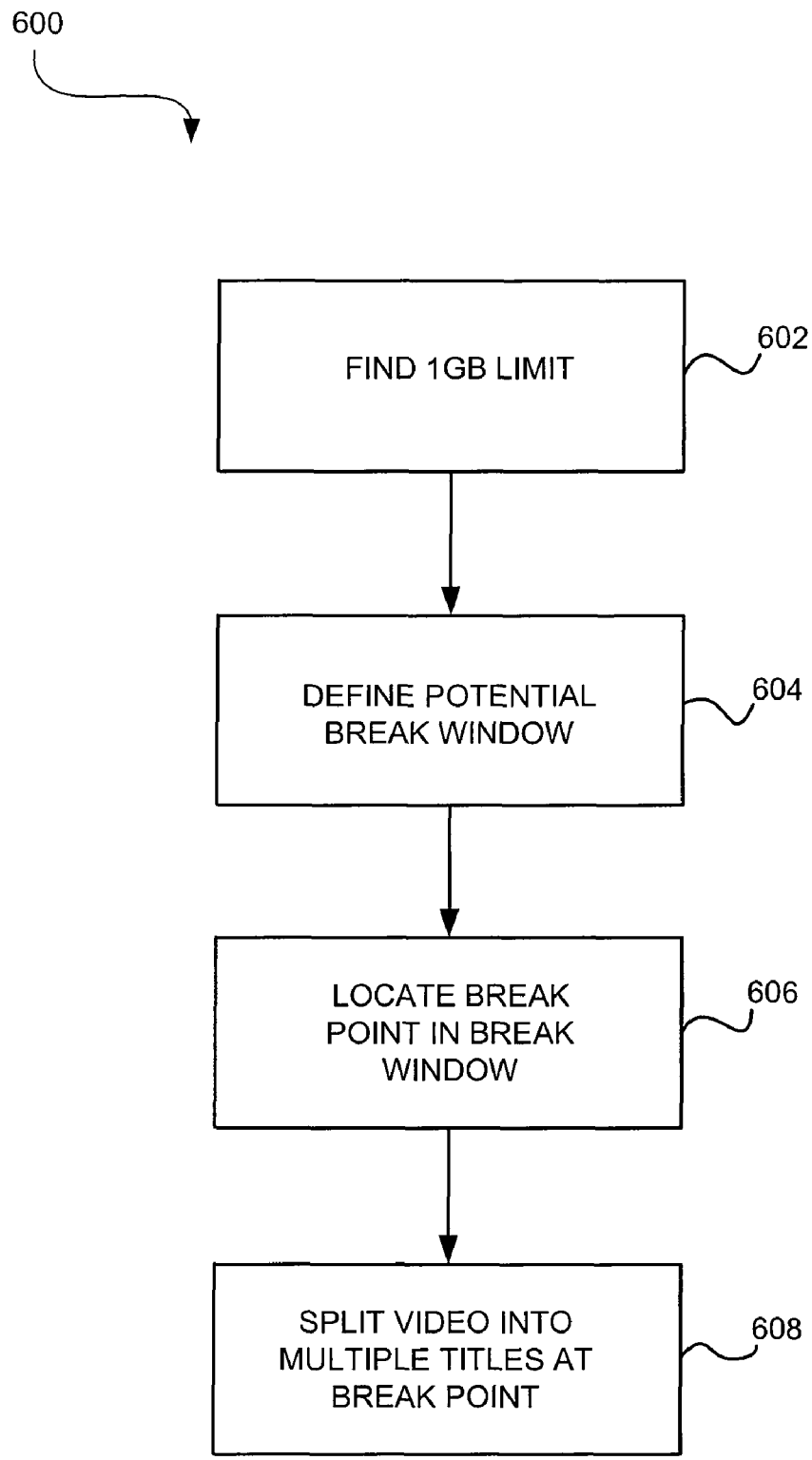
FIG. 6 illustrates a block diagram of a method for selecting a break point in accordance with an exemplary embodiment.

Moreover, methods for selecting a break point may be applied to any video file 103, as desired. For example, with reference now to FIG. 6 and in accordance with an exemplary embodiment, a method 600 for selecting a break point comprises identifying a 1 GB limit within a particular video file 103 (step 602). A potential break window is selected by identifying a portion of video file 103 prior to the 1 GB limit (step 604). A break point is then identified in the potential break window using at least one of audio energy map information, video timecode information, transcript information, and/or the like (step 606). A VOB file boundary is then defined at the break point (step 608). The method may be repeated as desired, for example to repeatedly define break points in a video file 103 with a size exceeding 2 GB.

Figure 7:
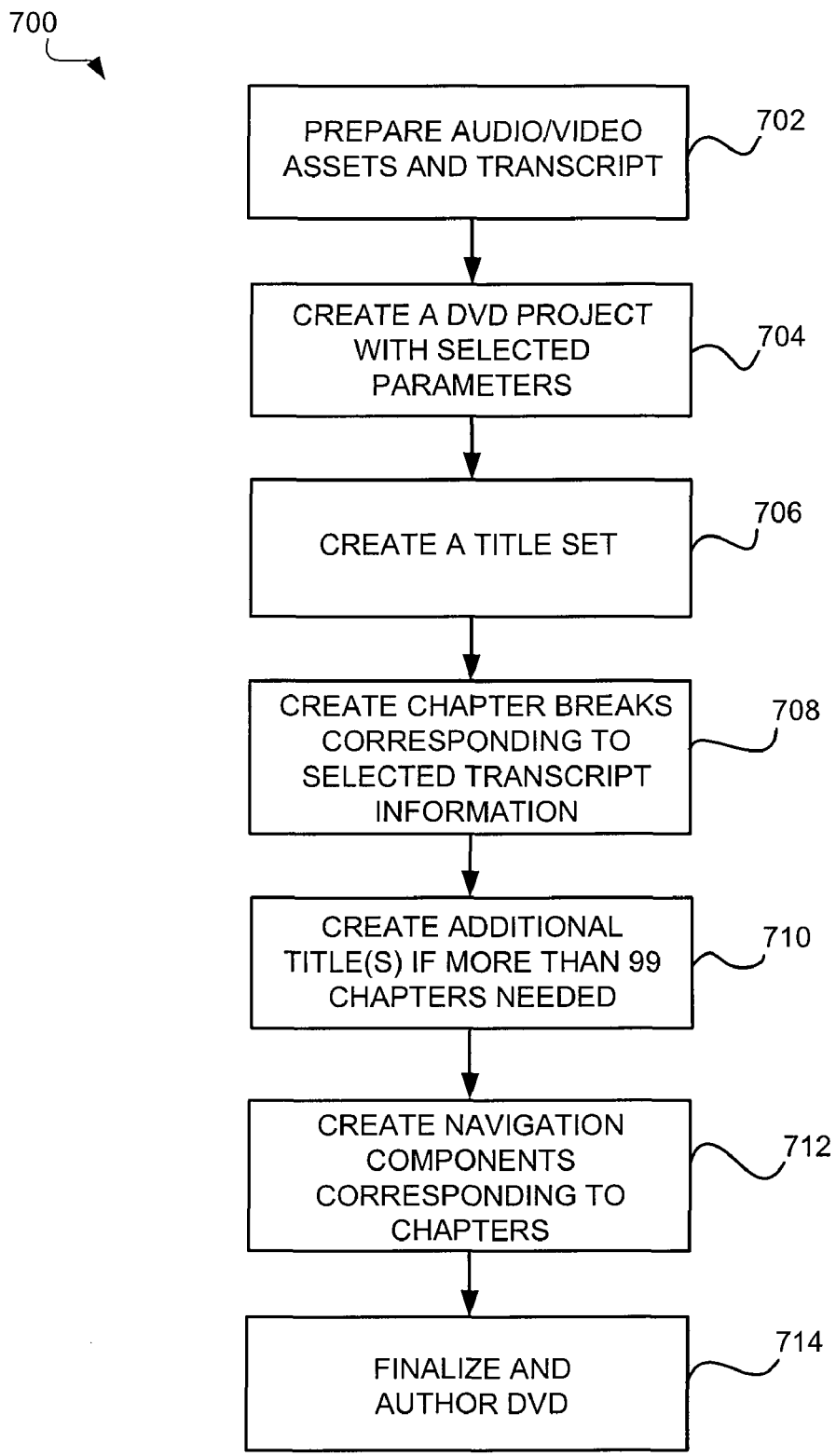
FIG. 7 illustrates a block diagram of a method for authoring a DVD in accordance with an exemplary embodiment.

Additionally, disc 101 may be created via use of any suitable software tools and/or authoring packages, as desired. For example, disc 101 may be created using Sonic AuthorScript. Disc 101 may also be created using Sonic DVD-It. Moreover, disc 101 may be created by hard-coding content for a DVD, for example at the byte level. Turning now to FIG. 7 and in accordance with an exemplary embodiment, a method 700 facilitates authoring a DVD (e.g., creating a disc 101) in accordance with various principles of the present disclosure.

Audio/video assets and transcript information are prepared (step 702). Various video files 103, transcript components 105, and/or the like may be gathered and identified for inclusion in system 100. Video files 103 and/or transcript components 105 may be modified, edited, transcoded, normalized, and/or otherwise prepared as discussed above.

A DVD project with selected parameters is created (step 704). For example, the video aspect ratio, language, region encoding, bitrate, and/or the like may be selected.

Within the DVD project, at least one title set corresponding to video transcript information is created (step 706). Within the title set, a title is created. An audio/video stream is added to the title by adding one or more desired audio/video assets to the title. This process may be repeated as desired with additional audio/video assets. Thus, for example, a first audio/video asset, a second audio/video asset, and a third audio/video asset may all be associated with one title within a title set.

In the title set, chapters and chapter points corresponding to a selected transcript portion size are defined (for example, one chapter point may correspond to one page of transcript text, one paragraph of transcript text, one line of transcript text, and/or any desired portion of transcript text) (step 708). Various transcript components 105 (e.g., text information, timecode information, and/or the like) may suitably be consulted in order to define chapters and chapter points. Moreover, display considerations, for example the amount of written text that can legibly be presented (e.g., on a particular display, at a particular resolution, and so on) may govern the amount of transcript text associated with a chapter. Chapters and chapter points may preferably be created for all text in a transcript file; however, a portion of text in a transcript file may also suitably be used.

Additional title sets and/or titles having corresponding chapters and chapter points may be created, for example if more than 99 chapter points are needed, if a video file size exceeds 1 GB, and so on (step 710). For example, a title break and/or title set break may be selected if a video file size exceeds 1 GB by locating the first page of transcript text corresponding to video information exceeding the 1 GB limit. A time slightly before the start time of this page may be chosen for a title break and/or title set break. In this manner, a particular title and/or title set may closely approach the 1 GB limit in size (e.g. be sized to within one pages worth of video information). Moreover, a title break and/or title set break may also be selected after the 99th chapter point.

Navigation components 107 corresponding to one or more chapters are created, facilitating navigation of a video file 103 at a granularity corresponding to a selected transcript portion size (step 712). For example, navigation components 107 may be created by turning each page of transcript text into a DVD-compliant MPEG still frame. Each MPEG still frame may be set as a DVD menu background, and one or more navigation buttons may be placed thereon. Various DVD menus may thus be created to facilitate navigation of a video file 103 at the selected transcript portion size. Moreover, additional DVD menus may be created for portions of a transcript which lack corresponding video information. For example, DVD menus may be created providing access to transcript title pages, transcript signature pages, and/or the like. As will be appreciated, such DVD menus associated with non-video transcript portions may be configured without corresponding "play video" capability, as video associated with these transcript portions does not exist. Alternatively, DVD menus associated with non-video transcript portions may be configured to facilitate navigation to a desired location (e.g., a main menu) and/or to a default location in a video file (e.g., the beginning of the file), as desired. Moreover, various DVD menus may be created such that when the DVD is played back on a stand-alone DVD player, the user is initially presented with a main menu (e.g., main menu 120), a chapter level menu providing access to the beginning of the video files 103 stored on disc 101, or other suitable default navigation location.

Once the desired DVD menus and associated navigation components 107 have been created, the DVD layout may then be transferred to a physical media by any suitable process and/or authoring package now known or later defined (step 714). The resulting disc 101 may be played back in a stand-alone DVD player, a personal computer, or other device configured to facilitate playback of DVD media.

In accordance with an exemplary embodiment, system 100 may be implemented on a DVD. Further, system 100 can be implemented as a "super disc" which contains both .UDF and .ISO partitions. In accordance with other exemplary embodiments, system 100 may be implemented on a Blu-Ray disc. Further, system 100 may be implemented in any suitable storage format. Additionally, system 100 may be implemented across multiple items of media, for example multiple DVDs, when a single piece of media provides insufficient storage space for one or more desired video files.

According to an exemplary embodiment, system 100 is further configured to facilitate display of material in addition to video and transcript data, such as exhibits. For example, a link to an exhibit may be implemented as a DVD menu button appearing at a suitable location (for example, a location synchronized to a video file transcript). Thus, a DVD menu button linking to an exhibit may only appear at suitable times when the exhibit in question is discussed in a transcript. In another exemplary embodiment, a DVD menu button linking to stored exhibits is available on main menu 120. A DVD menu button linking to stored exhibits may be provided at any suitable location in system 100, and may appear at any suitable time, as desired.

This disclosure has been made with reference to various exemplary embodiments including the best mode. However, those skilled in the art will recognize that changes and modifications may be made to the exemplary embodiments without departing from the scope of the present disclosure. For example, various operational steps, as well as components for carrying out operational steps, may be implemented in alternate ways depending upon the particular application or in consideration of any number of cost functions associated with the operation of the system, e.g., various of the steps may be deleted, modified, or combined with other steps. Additionally, various navigation components 107 may link directly to other navigation components 107, video files 103, transcript components 105, and/or the like. Various navigation components 107 may also link indirectly, such as through a series of sub-links, through a series of commands to an optical disc player, through a script executed by a processor, or by any other process or mechanism configured to facilitate access to a desired target location. These and other changes or modifications are intended to be included within the scope of the following claims.

Additionally, as will be appreciated by one of ordinary skill in the art, principles of the present disclosure may be reflected in a computer program product on a tangible computer-readable storage medium having computer-readable program code means embodied in the storage medium. Any suitable computer-readable storage medium may be utilized, including magnetic storage devices (hard disks, floppy disks, and the like), optical storage devices (CD-ROMs, DVDs, Blu-Ray discs, and the like), flash memory, and/or the like. These computer program instructions may be loaded onto a general purpose computer, special purpose computer, or other programmable data processing apparatus to produce a machine, such that the instructions that execute on the computer or other programmable data processing apparatus create means for implementing the functions specified. These computer program instructions may also be stored in a computer-readable memory that can direct a computer or other programmable data processing apparatus to function in a particular manner, such that the instructions stored in the computer-readable memory produce an article of manufacture including instruction means which implement the function specified. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure and may be expressed in the following claims.

The foregoing specification has been described with reference to various embodiments. However, one of ordinary skill in the art appreciates that various modifications and changes can be made without departing from the scope of the present invention as set forth in the claims below. Accordingly, the specification is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

The invention claimed is:

1. An information management system, comprising:
    a video file comprising a first VOB file and a second VOB file;
    a transcript of the video file, the transcript comprising question/answer pair information; and
    navigation components configured for use by a stand-alone DVD player, wherein the navigation components facilitate selective retrieval of the video file at a granularity defined by a portion of the transcript,
    wherein the boundary position between the first VOB file and the second VOB file is placed at a position after the completion of a first question/answer pair and prior to the beginning of the subsequent question/answer pair in the transcript.

2. The system of claim 1, wherein the navigation components are configured to facilitate selective retrieval of the video file at intervals corresponding to one page of the transcript.

3. The system of claim 1, wherein the portion of the transcript is one page.

4. The system of claim 1, wherein the navigation components comprise DVD menu objects associated with chapter points in a DVD title.

5. The system of claim 4, wherein the chapter points corresponding to locations in the video file correspond to page breaks in the transcript.

6. The system of claim 1, wherein the navigation components comprise DVD menu objects configured to facilitate navigation of a video file having more than 99 pages of associated transcript while remaining compliant with the DVD-Video specification.

7. The system of claim 1, wherein the navigation components comprise DVD menus.

8. The system of claim 7, wherein at least a portion of the DVD menus comprise a portion of text from the transcript.

9. The system of claim 8, wherein the portion of text is stored as a raster image configured to be legible when the DVD menus are displayed by a stand-alone DVD player.

10. The system of claim 1, further comprising exhibits associated with the video file.

11. The system of claim 1, wherein the video file comprises a composite video file formed from multiple video files having individual timecode information.

12. The system of claim 11, wherein the timecode information associated with each of the multiple video files is revised to reflect the position of each of the multiple video files within the composite video file.

13. The system of claim 1, wherein the video file is a recording of a legal deposition.

14. A method for browsing a video, comprising:
    providing a video file having an electronic transcript;
    creating a DVD menu system configured for navigation of the video file based on contents of the electronic transcript; and
    authoring a DVD comprising the video file and the DVD menu system,
    wherein the DVD menu system is compatible with a stand-alone DVD player,
    wherein, as authored on the DVD, the video file corresponds to at least first VOB file and a second VOB file, and
    wherein, as authored on the DVD, the file boundary position between the first VOB file and the second VOB file is placed at a position corresponding to multiple lines of the electronic transcript that are neither questions nor answers.

15. The method of claim 14, further comprising formatting a portion of the electronic transcript as a DVD menu object stored as a raster image configured to be legible when the DVD menus are displayed by a stand-alone DVD player.

16. The method of claim 14, wherein the DVD menu system facilitates selective retrieval of the video file in increments corresponding to one page of the transcript.

17. A method for video management, comprising:
locating a maximum VOB file size within a video file, the video file having a transcript;
selecting a portion of the video file prior to the maximum VOB file size;
evaluating the portion of the video file to select a first VOB file boundary position;
creating a first VOB file corresponding to the contents of the video file from the beginning of the video file to the first VOB file boundary position; and
creating a second VOB file corresponding to the contents of the video file from the first VOB file boundary position to at least one of the end of the video file or a second VOB file boundary position,
wherein the evaluating the portion of the video file comprises using question/answer pair information from the transcript,
wherein the first VOB file boundary position is placed at a position after the completion of a first question/answer pair, and
wherein the first VOB file boundary position is placed at a position prior to the beginning of the subsequent question/answer pair.

18. The method of claim 17, wherein the first VOB file boundary position is selected within a period of low audio energy having a duration of at least one second.

19. The method of claim 17, wherein the first VOB file boundary position is selected to prevent dropout of audible audio data when the video file is played back at the file level.

20. A non-transitory computer-readable medium having stored thereon, computer-executable instructions that, if executed by a system, cause the system to perform a method comprising:
providing a video file having an electronic transcript;
creating a DVD menu system configured for navigation of the video file based on contents of the electronic transcript; and
authoring a DVD comprising the video file and the DVI) menu system,
wherein the DVD menu system is compatible with a stand-alone DVD player,
wherein, as authored on the DVD, the video file corresponds to at least a first VOB file and a second VOB file, and
wherein, as authored on the DVD, the file boundary position between the first VOB file and the second VOB file is placed at a position corresponding to multiple lines of the electronic transcript that are neither questions nor answers.

21. A method for video management, comprising:
location a maximum VOB file size within a video file, the video file having a transcript;
selecting a portion of the video file prior to the maximum VOB file size;
evaluating the portion of the video file to select a first VOB file boundary position;
creating a first VOB file corresponding to the contents of the video file from the beginning of the video file to the first VOB file boundary position; and
creating a second VOB file corresponding to the contents of the video file from the first VOB file boundary position to at least one of the end of the video file or a second VOB file boundary position,
wherein the evaluating the portion of the video file comprises using transcript information, and
wherein the first VOB file boundary position is placed at a position corresponding to multiple transcript lines that are neither questions nor answers.

22. A method for video management, comprising:
locating a maximum VOB file size within a video file, the video file having a transcript;
selecting a portion of the video file prior to the maximum VOB file size;
evaluating the portion of the video file to select a first VOB file boundary position;
creating a first VOB file corresponding to the contents of the video file from the beginning of the video file to the first VOB file boundary position; and
creating a second VOB file corresponding to the contents of the video file from the first VOB file boundary position to at least one of the end of the video file or a second VOB file boundary position,
wherein the evaluating the portion of the video file comprises using transcript information, and
wherein the first VOB file boundary position is placed at a position corresponding to the transcript information comprising a discussion about going off the record.

* * * * *